US012809825B2

(12) United States Patent
Valt et al.

(10) Patent No.: US 12,809,825 B2
(45) Date of Patent: *Nov. 24, 2026

(54) TIME SERIES DATA LAYERED STORAGE SYSTEMS AND METHODS

(71) Applicant: Intertrust Technologies Corporation, Berkeley, CA (US)

(72) Inventors: Rando Valt, Tallinn (EE); Oleg Mürk, San Francisco, CA (US); Kaarel Nummert, Tallinn (EE); Kristo Iila, Tallinn (EE)

(73) Assignee: Intertrust Technologies Corporation, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/218,175

(22) Filed: May 23, 2025

(65) Prior Publication Data

US 2025/0284665 A1 Sep. 11, 2025

Related U.S. Application Data

(63) Continuation of application No. 18/132,348, filed on Apr. 7, 2023, now Pat. No. 12,346,294.

(60) Provisional application No. 63/329,346, filed on Apr. 8, 2022.

(51) Int. Cl.
*G06F 16/185* (2019.01)
*G06F 16/16* (2019.01)

(52) U.S. Cl.
CPC .......... *G06F 16/185* (2019.01); *G06F 16/162* (2019.01); *G06F 16/164* (2019.01)

(58) Field of Classification Search
CPC .... G06F 16/185; G06F 16/162; G06F 16/164; G06F 16/24; G06F 16/24568
See application file for complete search history.

(56) References Cited

U.S. PATENT DOCUMENTS

| | | | | |
|---|---|---|---|---|
| 9,753,935 | B1 * | 9/2017 | Tobin | G06F 16/248 |
| 10,033,706 | B2 * | 7/2018 | Bicket | H04W 4/70 |
| 10,775,976 | B1 * | 9/2020 | Abdul-Jawad | G06F 9/54 |

(Continued)

OTHER PUBLICATIONS

International Search Report and Written Opinion mailed Jul. 24, 2023 in International Application No. PCT/US 2023/017981.

(Continued)

*Primary Examiner* — Maher N Algibhah
(74) *Attorney, Agent, or Firm* — John P. Davis; Thayne and Davis LLC

(57) ABSTRACT

This disclosure relates to, among other things, scalable data processing, storage, and/or management systems and methods. In various embodiments, sequence number schemes associated with ingested data records may allow for improved management of data stored in one or more layers (e.g., hot and/or cold data storage layers) using data merging, deletion, and/or compaction techniques. In certain embodiments, certain data records stored in one or more segment files associated with a partition may be merged into compacted segment files, thereby reducing storage overhead associated with storing prior records that have been updated and/or deleted records. In further embodiments, data record tombstones may be employed in connection with the management of deleted records.

20 Claims, 6 Drawing Sheets

(56) References Cited

U.S. PATENT DOCUMENTS

| | | | | |
|---|---|---|---|---|
| 11,068,537 | B1 * | 7/2021 | Goyal | G06F 16/278 |
| 2020/0167360 | A1 * | 5/2020 | Rath | G06F 16/278 |

OTHER PUBLICATIONS

Official Communication from the European Patent Office mailed Nov. 15, 2024 in European Patent Application No. 23721155.4-1203.
Non-final Office Action dated Feb. 14, 2024, issued in U.S. Appl. No. 18/132,348.
Final Office Action dated Sep. 24, 2024, issued in U.S. Appl. No. 18/132,348.
Notice of Allowance dated Feb. 24, 2025, issued in U.S. Appl. No. 18/132,348.

* cited by examiner

TIME SERIES DATA LAYERED STORAGE SYSTEMS AND METHODS

CROSS-REFERENCE TO RELATED APPLICATIONS

This application is a continuation of U.S. application Ser. No. 18/132,348, filed Apr. 7, 2023, which claims the benefit of priority under 35 U.S.C. § 119(e) to U.S. Provisional Application No. 63/329,346, filed Apr. 8, 2022, both entitled "TIME SERIES DATA LAYERED STORAGE SYSTEMS AND METHODS," and which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY OF THE INVENTION

The present disclosure relates generally to systems and methods for managing data. More specifically, the present disclosure relates to systems and methods for managing time series data using layered data storage techniques.

Data applications that produce large volumes of time series data such as, for example and without limitation, Internet-of-Things ("IoT") networks, may benefit from highly scalable solutions for data ingestion, storage, and retrieval. When accessing time series data, it may be desirable to have more recent data available for queries with relatively minimal delay while also reducing storage costs associated with large volumes of data. Balancing both of these data storage and access goals using conventional techniques, however, may present certain challenges.

Embodiments of the disclosed systems and methods may use layered data storage techniques. In certain embodiments, data may be stored in at least two storage layers. For example, in some embodiments, a hot storage layer, where data may be stored in a record-oriented manner, may be used. Data stored in the hot storage layer may be made available for query with relatively minimal delay using more robust storage infrastructure. Consistent with various embodiments disclosed herein, a hot storage layer may have a mechanism to expire and/or otherwise clean up older data (e.g., delete and/or mark and/or otherwise schedule for eventual deletion), based on user direction and/or automatically after a certain period of time and/or after data ages by a certain amount (e.g., after a number of subsequent data entries, after data is not queried for a certain period of time, and/or the like) and/or via other automated data management processes. A cold storage layer, described in more detail below, may employ similar mechanisms to expire and/or otherwise clean up older data.

In further embodiments, a cold storage layer may be used, where data may be stored in relatively inexpensive storage infrastructure. In some embodiments, data stored in a cold storage layer may be stored in a compressed and/or columnar format. The access latency for data available in the cold storage layer, which in certain instances herein may be referred to as data availability latency (i.e., the time it takes for ingested data to be made available for access), may be relatively high compared with data in the hot storage layer, but the storage costs for larger volumes of data may be relatively smaller.

By using a multi-layered data storage technique consistent with various aspects of the disclosed embodiments, data may be stored in a way where certain data may be made available with relatively minimal query response latency and certain data may be stored in a relatively low cost and/or efficient storage solution. Further embodiments of the disclosed systems and methods provide techniques for managing and/or otherwise updating data stored between hot and cold storage layers using data merging and/or compaction techniques. In certain implementations, data storage and management techniques consistent with various aspects disclosed herein may be relatively seamless from the perspective of a user as to where the data is materialized. Indeed, in some embodiments, data may be stored in both hot and cold storage layers, with duplicate data stored in both storage layers being removed at query time.

BRIEF DESCRIPTION OF DRAWINGS

The inventive body of work will be readily understood by referring to the following detailed description in conjunction with the accompanying drawings, in which.

DETAILED DESCRIPTION OF THE INVENTION

Figure 1:
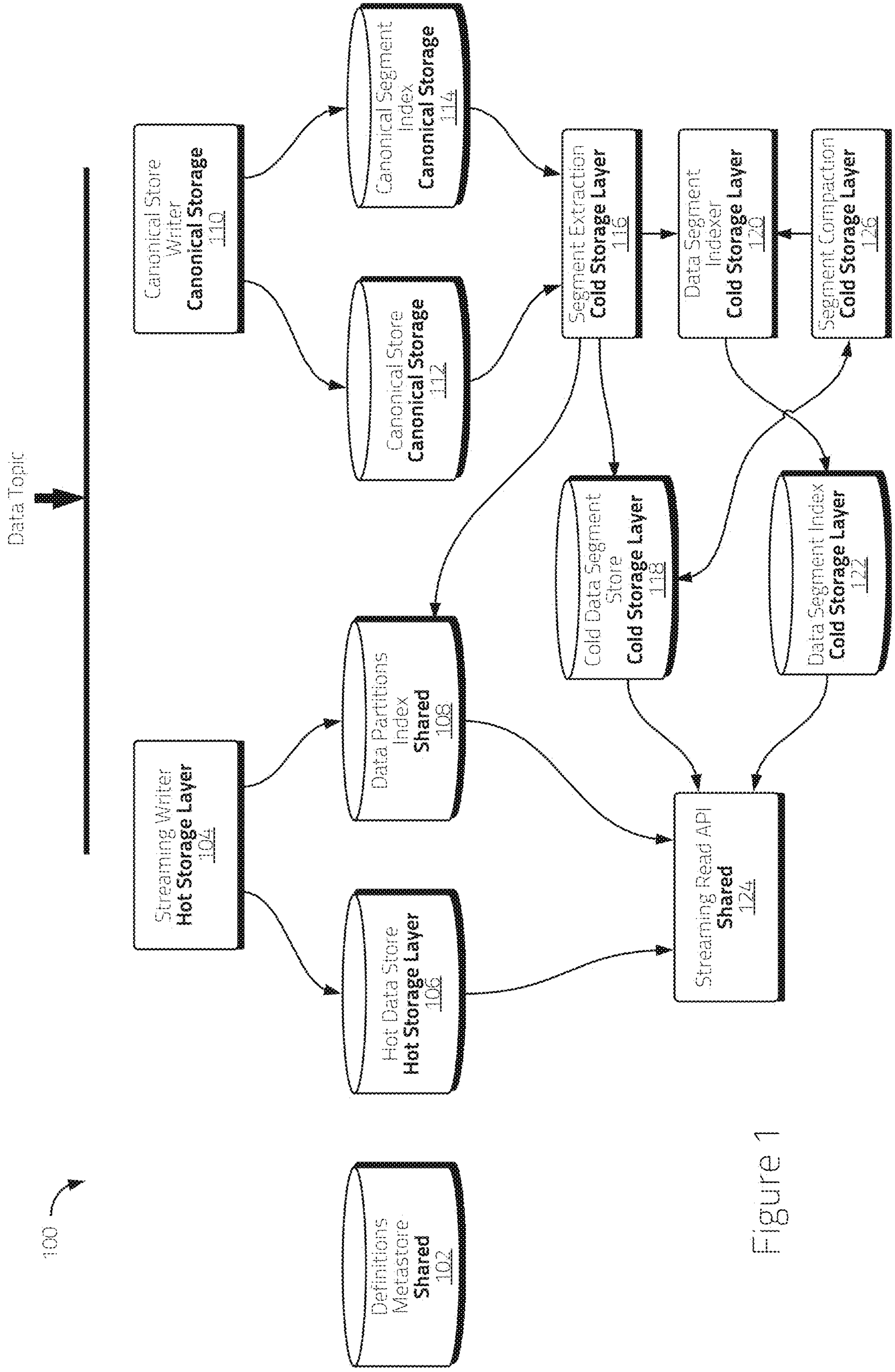
FIG. 1 illustrates a non-limiting example of a data storage and/or management service architecture consistent with certain embodiments disclosed herein.

A description of systems and methods consistent with embodiments of the present disclosure is provided herein. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Layered Data Storage and Management

Embodiments of the disclosed systems and methods may use layered data storage techniques to, among other things, provide data storage and/or management with relatively fast query response while reducing reliance on relatively expensive data storage infrastructure. Consistent with various embodiments disclosed herein, a data storage and/or management architecture may comprise a hot storage layer, where data may be made available for query with relatively minimal data availability latency, and a cold storage layer, where data may be stored in a compacted columnar format in a relatively inexpensive storage infrastructure.

In connection with certain Amazon Web Services ("AWS") data storage and/or other similar storage implementations, there may be relatively significant cost differences between fast block storage and cloud object storage. For example, AWS block storage on solid state drives may be significantly more expensive than AWS cloud object storage. This cost difference may be more significant if achieving higher durability using some object cloud storage services involves data replication as part of a data management architecture. For example, cloud object storage like AWS S3 may provide higher durability within a base service. Achieving comparable durability using fast block storage, however, may involve data replication that may be associated with more storage space and introduce extra costs.

In some implementations, data size when stored in compact columnar format may be smaller than when stored in row-oriented format. Embodiments of the disclosed systems and methods may manage data storage between hot and cold storage layers in a way that more efficiently realizes storage savings in view of the storage cost differences between the layers.

Consistent with various disclosed embodiments, records entering into the system may be processed by hot storage layer components. Processing data by the hot storage layer may, in some implementations, make incoming records available for queries with relatively shorter delay. A copy of the record may be added to a store, which may be referred to in certain instances as a canonical store, where data may be stored in record-oriented compressed chunks in a cloud object store. These chunks of data may be used to produce cold storage layer updates, which may be periodic in nature.

In connection with various embodiments of the disclosed systems and methods, stored data may be partitioned. That is, in some implementations, a mechanism may be employed to divide dataset records into data partitions so that any given data record with the same key values ends up in the same data partition. In some embodiments, an object store may not permit changing of existing objects and/or files, and as such data updates may produce new files written to the object store. For example, in certain embodiments, an update may produce a new updated file record, which may be a columnar file, for every time bucket (e.g., fixed size periods based on data timestamp used to divide data) and for every data partition (assuming there are records belonging to a given data partition and a given time bucket).

Data Filtering, Updates, and Deduplication

In various disclosed embodiments, a data retrieval mechanism may filter out possible duplicate records. To facilitate filtering of duplicate records, incoming records may be numbered and/or otherwise associated with sequence numbers. In certain embodiments, in the case of partitioned data, sequence numbers may be unique within a given partition (but in some implementations not necessarily unique globally) and may be monotonically increasing, although it will be appreciated that other suitable sequence number paradigms may also be used. In further embodiments, records in the system may be associated with a primary key, which may comprise a set of record values determining distinct records in the system, and a sequence number. A data deduplication mechanism consistent with various aspects of the disclosed embodiments may be employed in instances where there are multiple records with a same primary key such that the record of the multiple records with the highest sequence number is used (in the case of monotonically increasing sequence numbers)

Embodiments of the disclosed systems and methods may allow for record updates by allowing insertion of a new record with the same primary key. Embodiments of the deduplication mechanism described above may ensure that a latest record is used. To delete a record, a specific record with the same primary key as the record to be deleted, but with no data values (such a record which may be referred to herein in certain instances as a data record tombstone and/or derivatives thereof), may be inserted into the storage system. In various embodiments, a data record tombstone may be assigned a sequence number higher than the record that is intended to be replaced and/or otherwise deleted. The data record deduplication mechanism may thus retain the data record tombstone as the record with the highest sequence number.

Consistent with various aspects of the disclosed embodiments, columnar data files produced by the cold storage layer updated may be divided. In some embodiments, the data may be first divided into data partitions (e.g., based on some selected column values—that is, selector values). Then the data may be divided into fixed size periods based on data timestamps, which may be referred to as time buckets. Time buckets may, for example and without limitation, comprise daily, monthly, and/or yearly buckets. The choice about bucket size may be made based on expected query patterns, which may depend (at least in part) on what period(s) are likely to be queried together. Data may then be divided into data partitions.

Merging of Fragmented Data

Certain embodiments of the disclosed data management systems and methods may address segmentation of data over time. To have relatively less data in the hot storage layer, the system may update the cold storage layer with some frequency. Cold storage layer updates may produce a new segment file per data partition and per time bucket, leading over time to fragmented representation of data. This may increase data retrieval times as a larger number of segment files may need to be retrieved and processed for answering a query request. To address data fragmentation associated with data storage in the cold storage layer, embodiments of the disclosed systems and methods may merge multiple segment files of the same data partition and the same time bucket into one or more compacted segment files.

In at least one non-limiting example, a timeseries data table may comprise temperature measurements. Each record may have 3 fields: sensor_id, time, and temperature. The data may be partitioned by sensor_id—that is, each sensor data may belong to a separate data partition. In the example, sensors may report data once per minute.

A table may be configured to materialize data into a cold storage layer which may be updated periodically (e.g., daily). The data may be collected into time buckets (e.g., monthly time buckets). In some implementations, it may be assumed that the sensors operate correctly and therefore that there are few if any gaps in incoming data with minimal delays in data arrival. In addition, for the illustrative example, it may be assumed that the example system may run a cold store update at 6 PM on February $28^{th}$.

An update may produce at least one new segment file for each sensor containing record(s) since the last update (e.g., since 6 PM on the preceding day, February $27^{th}$). The next update running at 6 PM on March 1st may produce two segment files per sensor: one file belonging to the February time bucket containing records since the last update until March 1st at 00:00 and one file belonging to the March time bucket.

In the event there is delayed data included in the March 1st update (e.g., data associated with timestamps from January), then 3 separate files-belonging to January, February, and March time buckets—may be respectively created.

The number of segment files within any given time bucket of a data partition (e.g., exceeding a threshold) may trigger data compaction processes consistent with various aspects of the disclosed embodiments. In some embodiments, data compaction processes may eliminate duplicate records and/or tombstones using various aspects of the record deduplication mechanism detailed above. In further embodiments, data compaction processes may be performed and/or otherwise triggered periodically (e.g., based on a user specified period and/or the like), based on reaching a threshold size of segment files and/or records, and/or the like.

Data Storage and Time Periods

Data storage in storage layers consistent with various aspects of the disclosed embodiments may depend, at least in part, on one or more time periods, which may be set by a user and/or otherwise adjusted as appropriate. For example, a time period to update data stored in the cold storage layer may be denoted as $T_u$. Then a minimal time period of data stored in the hot storage layer may be $T_u+T_p$ (where $T_p$ is maximum time period required for processing a data increment to be available in the cold storage layer).

In at least east one non-limiting illustrative example, the cold storage layer may be updated daily (e.g., every 24 hours) and the cold storage layer update process may be set to not exceed one hour. In this example, $T_u$=24, $T_p$=1 and the time-to-live ("TTL") for data in the hot storage layer is $T_u+T_p$ (i.e., 25 hours). The set of possibly overlapping records may fall into the time period $T_p$.

In certain embodiments, instead of using both the hot storage layer and the cold storage layer for data storage and management, one of the hot storage layer or the cold storage layer may be used. For example, the hot storage layer may be used in applications where the most recent data need be stored and made available with minimal latency (and relatively low data volumes). The cold storage layer may be used in applications where data availability latency requirements are relatively low, but data volumes are relatively high.

Layered Data Storage and Management Architecture

FIG. 1 illustrates a non-limiting example of a data storage and/or management service architecture 100 consistent with certain embodiments disclosed herein. As shown, the architecture 100 may comprise systems, services, and/or components associated with a hot storage layer and a cold storage layer. The architecture 100 may further comprise systems, services, and/or components shared between the hot and cold storage layers and systems, services, and/or components associated with canonical storage.

Various embodiments of the disclosed systems and methods may use shared information included in a definitions metastore 102. The definitions metastore 102 may provide definitions relating to namespaces, which may allow for different users to operate on and/or process data in a particular table while operating in different namespaces. Namespaces may be used, for example and without limitation, to localize table names (e.g., table names may be unique within a namespace) and/or to apply access rights to a namespace. In some embodiments, information included the definitions metastore 102 may be used to grant access rights based on namespaces (e.g., by an access management system and/or service). For example, users may be granted privileges to access certain data tables and be restricted from accessing certain other data tables.

The definitions metastore 102 may further provide definitions relating to data tables, which may define the logical structure of data tables stored and/or otherwise managed by the service. Definitions relating to data tables may comprise, for example and without limitation, information relating to table elements and/or columns, data types, and/or the like. In some embodiments, the definitions metastore 102 may further provide information relating to one or more partitioning schemes (e.g., projections) supported by the data management service.

In some embodiments, the definitions metastore 102 may provide definitions relating to storage layers. For example, definitions may be provided regarding whether and/or what data should be stored in a hot storage layer, a cold storage layer, both storage layers, and/or the like, retention periods for stored data, which in some implementations may differ depending on the layer, update information for the hot and/or cold storage layers, criteria for data compaction operations, and/or the like. In this manner, information included in the definitions metastore 102 may help define the logical structure of data, how it should be partitioned by the service, how it should be written to storage, etc.

The hot storage layer may comprise a streaming writer 104 and a hot data store 106. Data ingested into the data storage and management service may be published into one or more partitioned topics, which in some implementations may comprise partitioned Kafka topics. In some embodiments, each message published to a topic may have a sequence number within an associated partition. For example, each message published to a Kafka topic may have an offset within a given Kafka topic partition, which may function as a sequence number for various data management operations consistent with embodiments disclosed herein. In some embodiments, the data storage and management service may expose a REST API that may allow external systems and/or services to insert data records into the data storage and/or management service.

Data may be consumed (e.g., consumed from each topic) by a streaming writer 104. In certain embodiments, the streaming writer 104 may be configured to detect which data partition an incoming data record belongs to, store the record in the hot data store in the partition, and/or associate the data record with the data partition key associated with the target data partition. In some embodiments, the streaming writer 104 may comprise a Cassandra key-value database. The streaming writer 104 may further detect new data partitions from the ingested data records, potentially repartitioning the ingested data if needed (e.g., based on information included in the definitions metastore 102), add the data partition record to a data partitions index 108 (if needed), which may be shared between the hot storage and cold storage layers, and then store the data record with the new data partition key in the hot data store 106.

In certain embodiments, sequence numbers may be assigned during the data ingestion process (e.g., assigned by the streaming writer 104). In various embodiments, sequence numbers may be globally unique and/or increase monotonically. In further embodiments, sequence numbers may be monotonically increasing and/or unique within a given data partition. In some implementations, data associated with topics ingested by the service may be associated with unique offset numbers within a given topic partition (e.g., as may be in the case with Kafka topics), which may be used as and/or otherwise associated with sequence numbers consistent with various aspects of the disclosed embodiments. It will be appreciated that sequence numbers may be associated with other paradigms.

In certain embodiments, data stored in the hot data store 106 may be associated with a time-to-live ("TTL") specifying a time and/or period that the data should be kept in the hot data store 106. In some embodiments, this information may be specified in the definitions metastore 102. For example, in connection with a hot data store 106 implemented using an Apache Casandra database, the relevant Cassandra table may have TTL set according to a user-specified configuration.

A canonical storage layer may comprise a canonical store writer 110, a canonical store 112, and a canonical segment index 114. Data ingested into the data storage and management service may be provided to the canonical store writer 110. The canonical store writer 110 may consume received topic record data, process the data, and/or store the data in a canonical store 112. The canonical store 112 may, in some embodiments, comprise a cloud-based storage service such as, for example and without limitation, AWS S3.

Files written to the canonical store 112 may be associated with a record added to the canonical segment index 114, which may provide index information relating to records stored in the canonical store 112. Data stored in the canonical store 112 may be used in connection with various cold layer storage operations, as discussed in more detail below, partitioning and/or repartitioning operations, data backup operations, and/or the like.

In some embodiments, the cold storage layer may comprise a segment extraction service 116, a cold data segment store 118, a data segment indexer 120, a data segment index 122, and/or a segment compaction service 126. Consistent with various disclosed embodiments, data stored in the canonical store 112 and/or index information included in the canonical segment index 114 may be used to build data records within the cold storage layer. For example and without limitation, the segment extraction service 116 may interact with the canonical store 112 and/or the canonical segment index 114 to access data from the canonical store 112, potentially process the data (e.g., partitioning and/or otherwise organizing the data into time buckets ordered by record time), and store the data within the cold data segment store 118. When data is stored in the cold data segment store 118, the segment extraction service 116 may interact with the data segment indexer service 120 to generate one or more records in a data segment index 122 associated with the data stored in the cold data segment store 118.

In various embodiments, the segment extraction service 116 may store data in the cold data segment store 118 based, at least in part, on information included in the definitions metastore 102. For example, the definitions metastore 102 may include information relating to cold data storage layer data storage and/or update scheduling, which may comprise information relating to update period, update frequency, update data amount thresholds, and/or the like. This information may be used by the segment extraction service 116 to schedule data recordation actions and/or updates from the canonical store 112 to the cold data segment store 118. For example and without limitation, the definitions metastore 102 may include update scheduling information indicating that the cold storage layer should be updated daily. Records added to the canonical store 112 in the day period may then be retrieved by the segment extraction service 116, partition the records in accordance with a partitioning scheme (which may be defined by information included in the definitions metastore 102), and then write the partitioned data to the cold data segment store 118. In some embodiments, data stored in the cold data segment store 118 may comprise columnar files.

In some embodiments, data written to the cold data segment store 118 may be divided between time periods, which may be referred to in certain instances herein as time buckets, so that data of a single data partition associated with timestamps belonging to a given time period are stored in the same time bucket. This may, among other things, facilitate streamlined data retrieval and/or management operations. For example, in connection with data retrieval over a specific time range, time bucket information may be used to quickly identify data segments for retrieval.

Data written to the cold data segment store 118 may be associated with one or more records included in a data segment index 122. For example, when a data record is recorded to the cold data segment store 118 by the segment extraction service 116, the segment extraction service 116 may interact with a data segment indexer 120 to add an index record to the data segment index 122 associated with the data record.

In at least one non-limiting example, the segment extraction service 116 may be implemented using Apache Spark and the cold data segment store 118 may be implemented using Parquet and/or AWS S3 storage. To populate the cold data segment store 118, a Spark job may be launched by the segment extraction service 116, potentially on a periodic basis (e.g., on a user-specified periodic basis). The Spark job may produce a new data segment for storage by the cold data segment store 118 as a Parquet file for defined data partitions and time buckets. The segment may be stored in AWS S3 storage and relevant entry may be added to the data segment index 122 by the data segment indexer 120. Another Spark job (e.g., a periodic Spark job) may be executed to implement segment compaction for datasets, which may in some implementations meet user-specified compaction criteria.

In various embodiments, use of a canonical storage layer in conjunction with a cold storage layer consistent with certain aspects of the disclosed systems and methods may allow for certain optimized data, processing, management, retrieval, and/or query functionality. For example and without limitation, the canonical store 112 may store record data in a compacted form, but the partitioning and/or division of data and use of time buckets in connection with the cold data segment store 118 may provide certain data processing, retrieval, management, and/or querying efficiencies that may not be otherwise realized directly by the canonical storage layer.

In certain embodiments, the definitions metastore 102 may comprise information used by various systems, services, and/or components of the disclosed service to determine which ingested topics should be recorded by the hot data storage layer and the canonical store (and by extension, the cold data storage layer). For example, in some embodiments, the streaming writer 104 and the canonical store writer 110 may use information included in the definitions metastore 102 to determine which ingested data should be recorded in the hot data store 106 and/or the canonical store 112.

In at least one non-limiting example, based on information included in the definitions metastore 102, an entire incoming data stream may be ingested by the canonical store writer 110 for storage in the canonical store 112 (and/or the cold data storage layer), but only a subset of data may be ingested by the streaming writer 104 for storage in the hot data store 106. In some embodiments, the subset may be associated with particular data topics, tables, and/or associated projections. For example, the definitions metastore 102 may include information directing that the streaming writer 104 process incoming data associated with a particular topic for storage in the hot data store 106 (e.g., if there is a hot storage materialization defined for the incoming topic and/or the like). It will be appreciated, however, that the definitions metastore 102 may comprise information specifying a variety of other ways that data included in a data stream be processed and/or otherwise ingested by the canonical store writer 110 and/or the streaming writer 104. For example, in some implementations, the definitions metastore 102 may comprise information specifying that all incoming data may be ingested by both the hot storage layer and the canonical storage layer.

In various embodiments, data stored in the canonical store 112 may be used in connection with data restoration and/or backup operations. For example, if data is deleted from the hot storage layer and/or the cold storage layer but remains stored in the canonical store 112, it may be restored to the hot storage layer and/or the cold storage layer from the canonical store 112.

In various embodiments, data stored in the canonical store 112 may be used in connection with data repartitioning operations. For example and without limitation, the data storage and/or management service and/or a user thereof may determine that it is advantageous to repartition data stored in the cold storage layer from the original materialized projection (e.g., based on how the data in the cold storage layer is being queried or the like). Using the data stored in the canonical store 112, the data may be repartitioned and stored in the cold data storage layer consistent with the updated projection. It will be appreciated that a variety of other events triggering a repartitioning of data in the cold data storage layer may be used in connection with various aspects of the disclosed embodiments. Moreover, it will be appreciated that data repartitioning from the canonical store 112 may be similarly performed in connection with the hot storage layer.

When retrieving data from the service, a streaming read API 124 may be queried with relevant query information (e.g., identifying data partitions and/or time periods). The streaming read API 124 may query the hot and cold storage layers based on the identified data partitions and/or time periods. In some embodiments, low level data retrieval components may apply filters to the fetched data. The time-ordered sequences of records belonging to data partitions fetched from both layers may be processed by a deduplicator, where records having the same primary key but lower sequence number may be discarded. Then records from different data partitions may be merged into single result and optional post-processing like sorting or aggregation may be executed.

Consistent with various disclosed embodiments, a segment compaction service 126 may launch segment merging and/or compaction operations consistent with various disclosed embodiments (e.g., by launching an associating Spark job), potentially on a periodic basis and/or according to a user-specified schedule. In some embodiments, the segment compaction operation may be performed and/or otherwise implement certain user-specified compaction criteria.

Multi-Dimensional Data Structures

Figure 2:
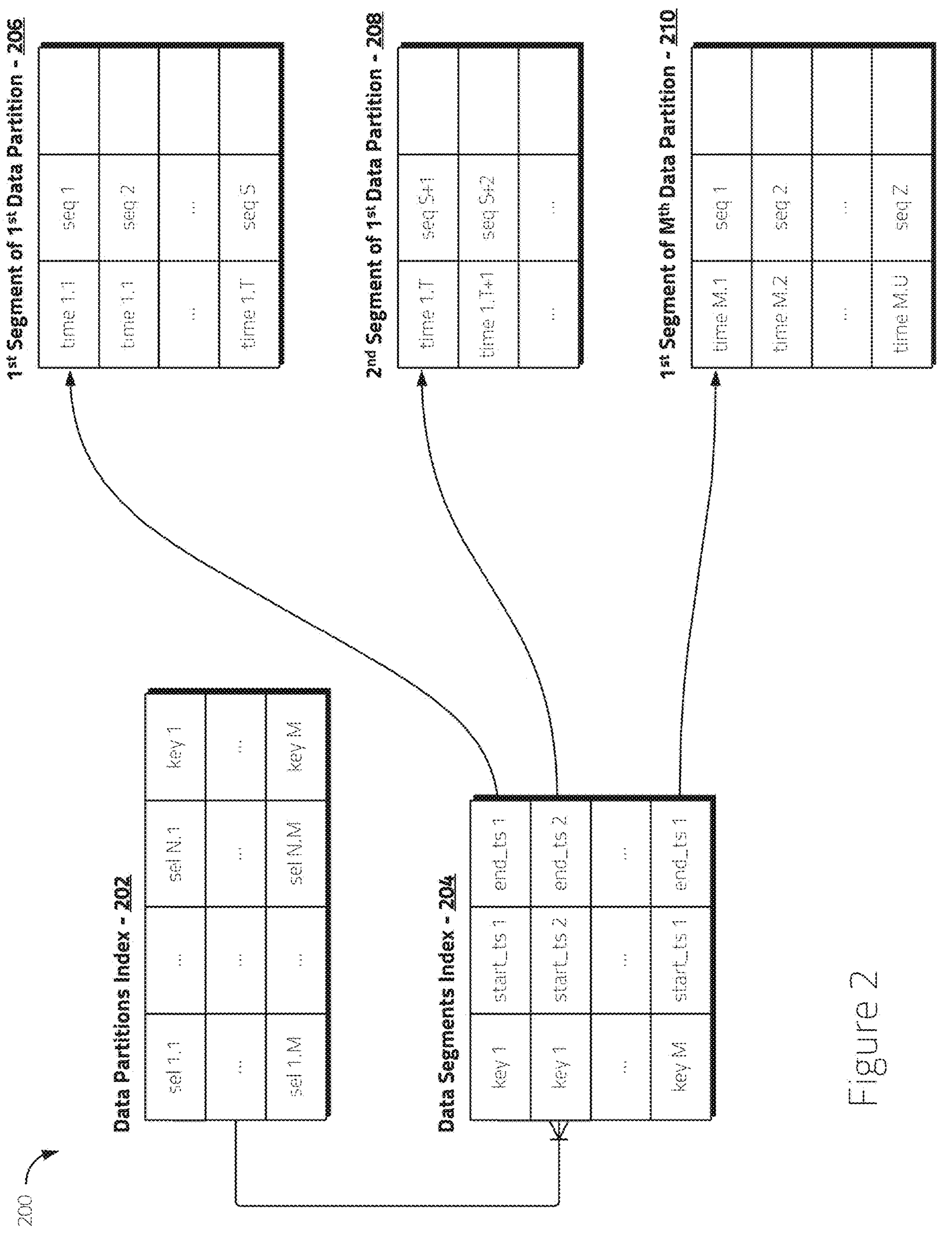
FIG. 2 illustrates a non-limiting example of a multi-dimensional data management structure using data partitions and data segments consistent with certain embodiments disclosed herein.

FIG. 2 illustrates a non-limiting example of a multi-dimensional data management structure 200 using data partitions and data segments consistent with certain embodiments disclosed herein. As illustrated, ingested data may be organized in a multi-dimensional space with a first dimension comprising an index to data partitions 202 and a second dimension comprising an index to data segments 204 within data partitions. In many embodiments, data and/or entries within data segments may be time ordered.

In some embodiments, a data table may comprise columns, from which a subset of columns may be selected for calculating data partitioning keys. In some implementations, these columns of a data table may comprise entries that may be referred to as selectors. Selectors may be associated with a given partitioning scheme (which may be referred to in certain instances herein as a data projection and/or derivatives of the same). In some embodiments, data partition keys may be calculated as a function of certain data values included in a data table (e.g., a hash function). As illustrated in connection with FIG. 2, selectors may be included in a data partitions index 202 associated with data partition keys.

The data segments index 204 may associate data partition keys with specific timestamp ranges. As shown, a data partition key may be associated with multiple segments of a particular data partition (e.g., data partition key key 1 may be associated with the first and second data segments 206, 208 of the first data partitions). In some instances, a data partition key may be associated with a single segment of a data partition (e.g., data partition key key M may be associated with a first data segment 210 of a $M^{th}$ data partition).

In certain circumstances, multiple records may exist that are associated with a same timestamp. For example, in the illustrated example, records with timestamp 1.T may exist in the both the first and the second segments 206, 208 of the first data partition. Consistent with various embodiments disclosed herein, ingested records and/or data may be associated with a sequence number. Multiple records associated with the same timestamp may be differentiated based on associated sequence numbers.

In some embodiments, sequence numbers may be globally unique and increase monotonically. In further embodiments, sequence numbers may be unique within a given data partition. In the event there are duplicate records in the system, during data retrieval and/or querying processes, duplicate records may be filtered out so that only the data and/or record with the highest sequence number is returned. In certain embodiments, additional table columns may be associated with a data record to allow for additional information to be associated with the record and be used in connection with record differentiation.

Sequence numbers associated with data records may be used in connection with a variety of data operations including, for example and without limitation, data update, data access, data deletion, and/or data compaction and/or merging operations. For example, as noted above, sequence numbers may be used in connection with ingesting and retrieving updates of previously ingested data records, where a data record with a higher sequence number may be retrieved as part of a query to ensure the most up to date record is retrieved. For example, as illustrated in connection with FIG. 2, a data record associated with timestamp time 1.1 in the first segment 206 of the first data partition may be associated with sequence number seq 1. An update to the data record, also associated with timestamp time 1.1, may be ingested and stored in same segment 206. To distinguish this updated data record from the original data record associated with timestamp time 1.1, the updated data record may be assigned sequence number seq 2. In a data retrieval and/or other data processing and/or management operation, the record with the greater sequence number—that is, sequence number seq 2-would be retrieved and/or otherwise considered the most up to date data record.

In at least one non-limiting example, a data table may comprise columns $col_1$, $col_2$, $col_3$, $col_4$, where $col_2$ and $col_3$ are the selectors for projection $p_1$ and a record $r_N$ is a collection of tuples of column identifier and value ($id(col_1)$, $val_{1N}$), ($id(col_2)$, $val_{2N}$), ($id(col_3)$, $val_{3N}$), ($id(col_4)$, $val_{4N}$)). The data partitioning key in projection $p_1$ for record $r_N$ may be calculated based on $key_N = f(val_{2N}, val_{3N})$ where $f(\,)$ is the data partition key calculation function (e.g., a hash function). In some embodiments, for processing or storing data partitions in P partitions, the relevant processing/storage partition index can be calculated as hash ($key_N$) mod P.

Sequence numbers consistent with various aspects of the disclosed systems and methods may allow for streamlined data updates and/or retrieval operations. In addition, as in some implementations original data may not be deleted when updates are received (and in some embodiments may be assigned higher sequence numbers), use of sequence numbers consistent with various aspects of the disclosed embodiments may facilitate data auditing and/or other methods of inspecting data record history, provenance, and/or the like. As original data may not be immediately deleted (and/or may be configured to be retained in perpetuity and/or for some length of time depending on how data cleanup and/or deduplication processes are configured), use of sequence numbers consistent with aspects of the disclosed embodiments may provide data record versioning and/or backup functionality, where data records with lower sequence numbers may be accessed to access prior versions of data records.

Data Compaction and Merging

Figure 3:
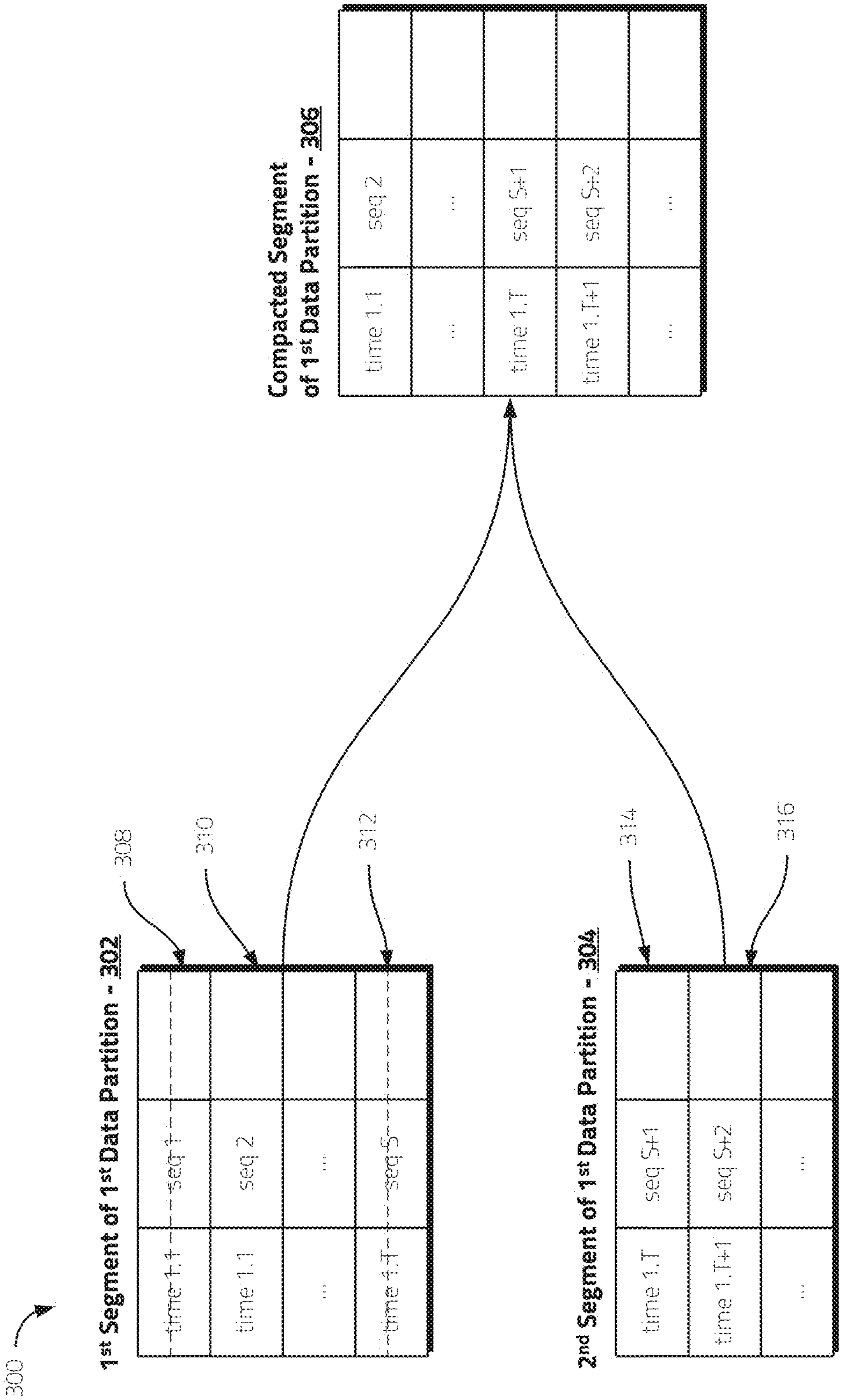
FIG. 3 illustrates a non-limiting example of a data compaction process consistent with certain embodiments disclosed herein.

FIG. 3 illustrates a non-limiting example of a data compaction process 300 consistent with certain embodiments disclosed herein. As illustrated, a first record 308 associated with timestamp time 1.1 may be stored in a first segment of a first data partition 302 and be associated with sequence number seq 1. A second record 310 also associated with timestamp time 1.1 may also be stored in the first segment of the first data partition 302, associated with a higher sequence number seq 2. The second record 310 may comprise, for example, an update to the first record 308. Consistent with various embodiments disclosed herein, data compaction processes may generate a compacted segment of a first data partition 306 that comprises the record with the higher sequence number—that is, the second data record 310 associated with timestamp time 1.1 and sequence number seq 2.

Similarly, a data record 312 associated with timestamp time 1.T may be stored in the first segment of the first data partition 302 and be associated with sequence number seq S. A different data record 314 associated with timestamp time 1.T may be stored in the second segment of the first data partition 304 and be associated with sequence number seq S+1. A data compaction process consistent with certain embodiments disclosed herein may add the record with the higher sequence number—that is, the data record 314 associated with timestamp time 1.T and sequence number seq S+1—to the compacted data segment 306.

In the illustrated example, a data record 316 included in the second segment of the second data partition 304 associated with timestamp time 1.T+1 and sequence number seq S+2 may also be added to the compacted data segment 306. In this manner, the most current data records of the first and second segments of the first partition 302, 304 may be combined in the compacted data segment of the first data partition 306 (with the first and second segments 302, 304 being scheduled for eventual deletion).

Figure 4:
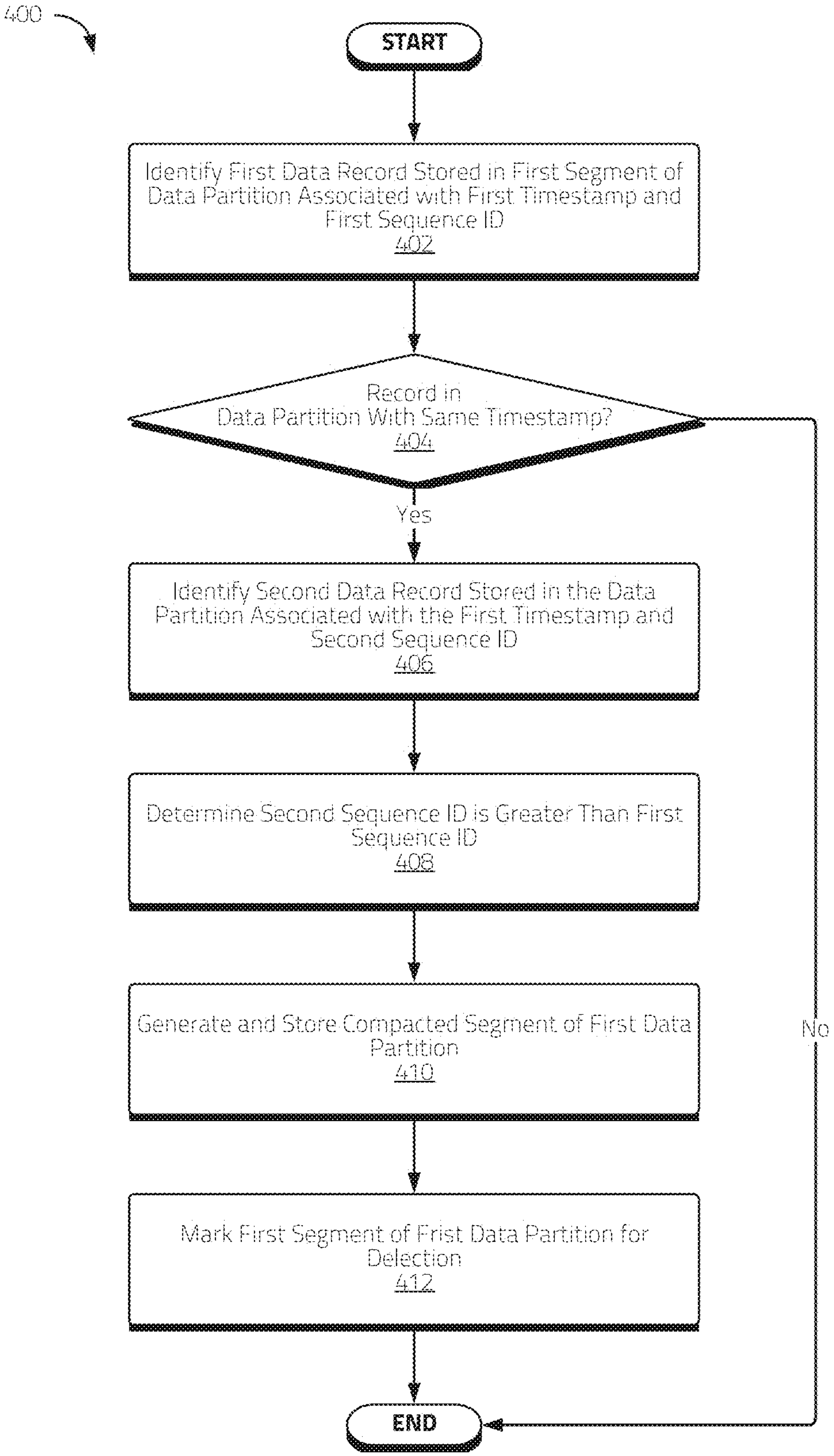
FIG. 4 illustrates a flow chart of a non-limiting example of data compaction process consistent with certain embodiments disclosed herein.

FIG. 4 illustrates a flow chart of a non-limiting example of data compaction process 400 consistent with certain embodiments disclosed herein. The illustrated process 400 may be implemented in a variety of ways, including using software, firmware, hardware, and/or any combination thereof. In certain embodiments, various aspects of the process 400 and/or its constituent steps may be performed by one or more systems and/or services, including systems and/or services that may implement aspects of a hot data storage layer, a cold data storage layer, a canonical data store, and/or various shared systems and/or services.

In various embodiments, the data compaction process 400 and/or aspects thereof may be initiated periodically, based on user direction, and/or following one or more conditions and/or triggers. For example, in various embodiments, the disclosed data compaction process and/or aspects thereof may be initiated based on determining that a total number of data segments of a data partition has reached a threshold number of data segments, a total storage size of a data partition has reached a threshold total storage size, and/or the like.

At 402, a first time series data record stored in a first segment of a first data partition may be identified. In various embodiments, the first data partition may be stored in a cold data store (e.g., a cold data store managed, at least in part, by a data management service system). In certain embodiments, the cold data store may comprise a cloud service data store.

The first time series data record may be associated with a first timestamp and a first sequence identifier. In various embodiments, sequence identifiers may comprise sequence numbers, although other types of sequence identifiers may also be used. In certain embodiments, sequence identifiers and/or numbers may be monotonically increasing and/or be unique within a given partition.

It may be determined at 404 whether another record in the first data partition is associated with the same timestamp as the first timestamp (e.g., as may be the case if an update, revision, and/or newer record to the first time series data record has been stored in the first data partition). If so, the process 400 may proceed to 406, where a second time series data record stored in the first data partition that is associated with the first timestamp may be identified. In various embodiments, the second time series data record may be associated with a second sequence identifier. In certain embodiments, the second time series data record may be stored in the first segment of the first data partition. In further embodiments, the second time series data record may be stored in another segment of the first data partition.

At 408, it may be determined that the second sequence identifier is greater than the first sequence identifier, indicating that the second time series data record was recorded after the first time series data record. Based on this determination, a compacted segment of the first data partition may be generated and/or stored at 410. The compacted data segment may comprise the second time series data record. In certain circumstances, a record may be updated multiple times. In various embodiments, a record with the largest sequence identifier (e.g., indicating it is the most recent updated record) sharing a timestamp with other records may be identified and included in the compacted data segment.

Following generation and/or storage of the compacted data segment, the first segment of the first data partition may be marked for deletion at 412. In certain embodiments, when new segments are stored in a data partition, a cold storage layer data segment index may be updated.

In some embodiments, a third time series data record may be identified in the first data segment of the first data partition that is associated with a second timestamp and a third sequence identifier. A fourth time series data record stored in a second segment of the first data partition may be further identified that is also associated with the second timestamp and is further associated with a fourth sequence identifier. It may be determined that the fourth sequence identifier is greater than the third sequence identifier, and the generated compacted segment of the first data partition may further include the fourth time series data record. In this manner, a compacted segment may comprise records originating from a plurality of data segments of a data partition. Like the first data segment, the second data segment may be marked for deletion as part of the compaction process.

In certain embodiments, marking one or more data segments for deletion may comprise scheduling data segment(s) for deletion. For example and without limitation, deletion of data segments may be scheduled to occur at a particular deletion time. The deletion time may comprise, for example, a next scheduled deletion time, which may be periodic and/or scheduled by a user, a deletion time determined based, at least in part, on determining that a total number of data segments of the first data partition has reached a threshold number of data segments, determining that a total storage size of the first data partition has reached a threshold total storage size, and/or the like.

Data Record Deletion and Tombstones

Figure 5:
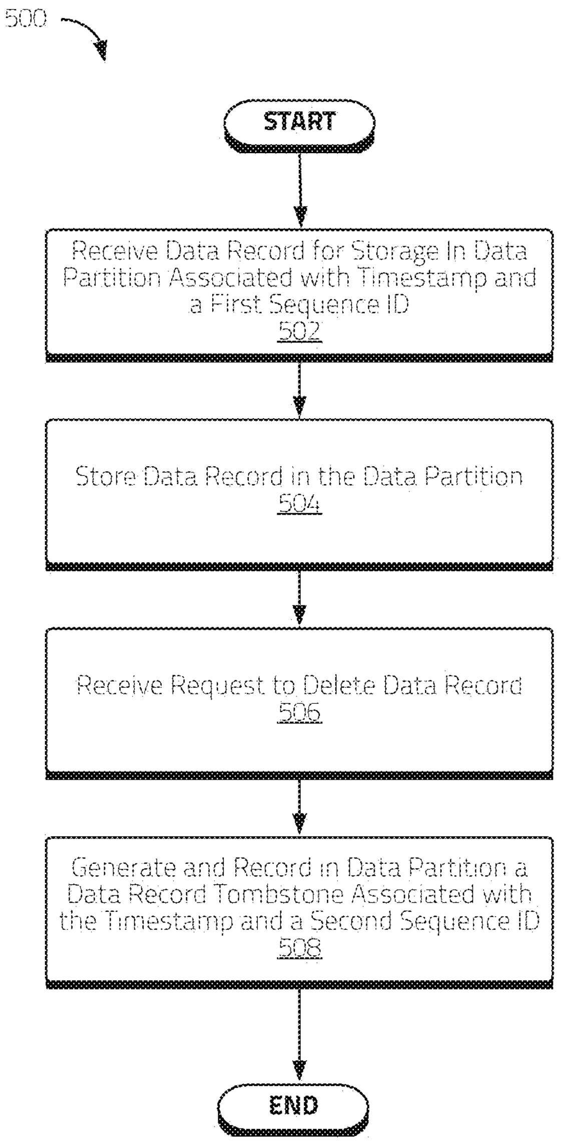
FIG. 5 illustrates a flow chart of a non-limiting example of data record deletion process using data record tombstones consistent with certain embodiments disclosed herein.

FIG. 5 illustrates a flow chart of a non-limiting example of data record deletion process 500 using data record tombstones consistent with certain embodiments disclosed herein. The illustrated process 500 may be implemented in a variety of ways, including using software, firmware, hardware, and/or any combination thereof. In certain embodiments, various aspects of the process 500 and/or its constituent steps may be performed by one or more systems and/or services, including systems and/or services that may implement aspects of a hot data storage layer, a cold data storage layer, a canonical data store, and/or various shared systems and/or services.

At 502, a time series data record may be received for storage in a data partition (e.g., a data partition of a cold data store). Consistent with various disclosed embodiments, the time series data record may be associated with a timestamp and a first sequence identifier. The time series data record may be stored in the data partition at 504.

A request to delete the time series data record may be received at 506. In response to the deletion request, a time series data record tombstone may be generated and stored (stored in the data partition in the same and/or a different segment within the data partition) at 508. Consistent with embodiments disclosed herein, the data record tombstone may be associated with the timestamp and a second sequence identifier, which may be higher and/or greater than the first sequence identifier, indicating that the tombstone was recorded after the time series data record. In some embodiments, the time series data record tombstone may not include any data values (i.e., it may be an empty data record) and/or comprise information indicating and/or otherwise identifying that the record is a tombstone record.

Consistent with certain embodiments disclosed herein, the tombstone record may be identified as part of a data cleanup, compaction, and/or merging processes consistent with various disclosed embodiments and used in connection with data management processes. For example and without limitation, in some embodiments, a record associated with a tombstone record may not be included in a compacted data segment (which may or may not include the tombstone record) generated as part of a data compaction and/or merging process.

Example System Architecture

Figure 6:
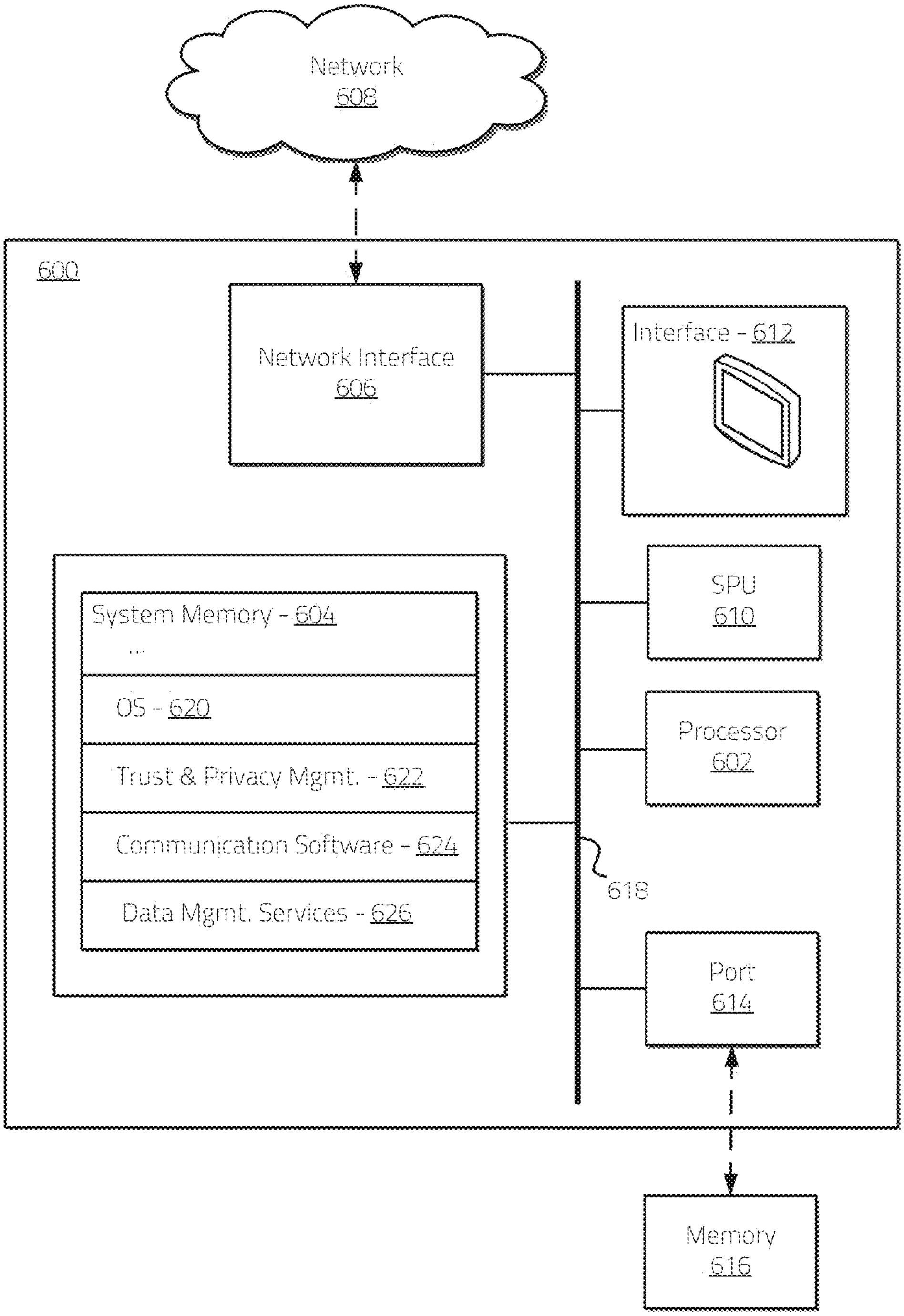
FIG. 6 illustrates a non-limiting example of a system that may be used to implement certain embodiments of the systems and methods of the present disclosure.

FIG. 6 illustrates an example of a system 600 that may be used to implement certain embodiments of the systems and methods of the present disclosure. The various systems, services, and/or devices used in connection with aspects the disclosed embodiments may be communicatively coupled using a variety of networks and/or network connections (e.g., network 608). In certain embodiments, the network 608 may comprise a variety of network communication devices and/or channels and may utilize any suitable communications protocols and/or standards facilitating communication between the systems and/or devices.

The network 608 may comprise the Internet, a local area network, a virtual private network, and/or any other communication network utilizing one or more electronic communication technologies and/or standards (e.g., Ethernet or the like). In some embodiments, the network 608 may comprise a wireless carrier system such as a personal communications system ("PCS"), and/or any other suitable communication system incorporating any suitable communication standards and/or protocols. In further embodiments, the network 608 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), time divisional multiple access ("TDMA") standards, 4G and/or 5G communication standards (e.g., Long-Term Evolution ("LTE"), 5G New Radio ("NR"), orthogonal frequency division multiple access ("OFDMA"), etc.). In certain embodiments, the network 608 may incorporate one or more satellite communication links. In yet further embodiments, the network may utilize IEEE's 802.11 standards, Bluetooth*, ultra-wide band ("UWB"), Zigbee*, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 6, the example system 600 may comprise: a processing unit 602; system memory 604, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 602; a port 614 for interfacing with removable memory 616 that may include one or more diskettes, optical storage mediums (e.g., flash memory, thumb drives, USB dongles, compact discs, DVDs, etc.) and/or other non-transitory computer-readable storage mediums; a network interface 606 for communicating with other systems via one or more network connections and/or networks 608 using one or more communication technologies; a user interface 612 that may include a display and/or one or more input/output devices such as, for example, a touchscreen, a keyboard, a mouse, a track pad, and the like; and one or more busses 618 for communicatively coupling the elements of the system.

In some embodiments, the system 600 may, alternatively or in addition, include an SPU 610 that is protected from tampering by a user of the system 600 or other entities by utilizing secure physical and/or virtual security techniques. An SPU 610 can help enhance the security of sensitive operations such as personal information management, trusted credential and/or key management, privacy and policy management, and other aspects of the systems and methods disclosed herein. In certain embodiments, the SPU 610 may operate in a logically secure processing domain and be configured to protect and operate on secret information, as described herein. In some embodiments, the SPU 610 may include internal memory storing executable instructions or programs configured to enable the SPU 610 to perform secure operations, as described herein.

The operation of the system 600 may be generally controlled by the processing unit 602 and/or an SPU 610 operating by executing software instructions and programs stored in the system memory 604 (and/or other computer-readable media, such as removable memory 616). The system memory 604 may store a variety of executable programs or modules for controlling the operation of the system 600. For example, the system memory may include an operating system ("OS") 620 that may manage and coordinate, at least in part, system hardware resources and provide for common services for execution of various applications and a trust and privacy management system 622 for implementing trust and privacy management functionality including protection and/or management of personal data through management and/or enforcement of associated policies. The system memory 604 may further include, without limitation, communication software 624 configured to enable in part communication with and by the system 600, one or more applications, data management services 626 configured to implement various aspects of the disclosed systems and/or methods, and/or any other information and/or applications configured to implement embodiments of the systems and methods disclosed herein and/or aspects thereof.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, systems, services, and/or components presented in connection with the figures and/or associated description within the scope of the inventive body of work, and that the examples presented in the figures and described herein are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

The invention claimed is:

1. A method for managing time series data performed by a data management service system, the data management service system comprising at least one processor and a non-transitory computer-readable medium storing instructions that, when executed by the at least one processor, cause the data management service system to perform the method, the method comprising:

identifying a time series data record stored in a first segment of a first data partition, the first data partition being stored in a cold data store managed, at least in part, by the data management service system, the time series data record being associated with a first timestamp and a first sequence identifier;

identifying a tombstone data record stored in the first data partition, the tombstone data record also being associated with the first timestamp and further being associated with a second sequence identifier, the second sequence identifier being different than the first sequence identifier;

determining that the second sequence identifier is greater than the first sequence identifier;

generating a compacted segment of the first data partition, wherein generating the compacted data segment is based, at least in part, on determining that the second sequence identifier is greater than the first sequence identifier, the compacted segment not including the time series data record and the tombstone data record;

storing the compacted segment in the first data partition; and marking the first segment of the first data partition for deletion by the data management service system.

2. The method of claim 1, wherein the tombstone data record is stored in the first segment of the first data partition.

3. The method of claim 1, wherein the tombstone data record is stored in a second segment of the first data partition.

4. The method of claim 1, wherein the cold data store comprises a cloud service data store.

5. The method of claim 1, wherein the first sequence identifier and the second sequence identifier are unique within the first data partition.

6. The method of claim 5, wherein the first sequence identifier is greater than a sequence identifier assigned to a prior data record.

7. The method of claim 1, wherein the tombstone data record comprises an indication that the tombstone data record is a tombstone data record.

8. The method of claim 1, wherein the tombstone data record comprises an empty data record field.

9. The method of claim 1, wherein the method further comprises updating, in response to storing the compacted segment in the first data partition, a cold storage layer data segment index.

10. The method of claim 1, wherein the first sequence identifier comprises a first sequence number and the second sequence identifier comprises a second sequence number.

11. The method of claim 1, wherein marking the first segment of the first data partition for deletion by the data management service system comprises scheduling the first data segment of the first data partition for deletion.

12. The method of claim 11, wherein scheduling the first data segment of the first data partition for deletion comprises scheduling the first data segment of the first data partition for deletion at a next deletion time by the data management service system.

13. The method of claim 12, wherein the next deletion time comprises a periodic deletion time.

14. The method of claim 13, wherein the periodic deletion time comprises a periodic deletion time defined by a user of the data management service system.

15. The method of claim 12, wherein the next deletion time is determined based, at least in part, on determining that a total number of data segments of the first data partition has reached a threshold number of data segments.

16. The method of claim 12, wherein the next deletion time is determined based, at least in part, on determining that a total storage size of the first data partition has reached a threshold total storage size.

17. The method of claim 1, wherein the method further comprises deleting the first segment of the first data partition.

18. A method for managing time series data performed by a data management service system, the data management service system comprising at least one processor and a non-transitory computer-readable medium storing instructions that, when executed by the at least one processor, cause the data management service system to perform the method, the method comprising:

receiving a time series data record, the first time series data record being associated with a first time stamp;

storing the time series data record in a first segment of a first data partition of a cold data store managed, at least in part, by the data management service system, wherein storing the time series data record comprises associating the time series data record with a first sequence identifier;

receiving a request to delete the time series data record from the first data partition;

generating, in response to the request to delete the time series data record, a tombstone data record, the tombstone data record also being associated with the first time stamp and further being associated with a second sequence identifier, the second sequence identifier being different than the first sequence identifier;

storing the tombstone data record in the first segment of the first data partition of the cold data store; and deleting the time series data record and the tombstone data record based, at least in part, on determining that the second sequence identifier is greater than the first sequence identifier.

19. The method of claim 18, wherein the tombstone data record comprises at least one of an indication that the tombstone data record is a tombstone data record and an empty data record field.

20. The method of claim 19, wherein deleting the tombstone data record is based on at least one of determining that the tombstone data record comprises the indication and determining that the tombstone data record comprises an empty data record field.

* * * * *